US012592329B2

(12) United States Patent
Lan et al.

(10) Patent No.: US 12,592,329 B2
(45) Date of Patent: *Mar. 31, 2026

(54) R-T-B-BASED PERMANENT MAGNET MATERIAL, PREPARATION METHOD THEREFOR AND USE THEREOF

(71) Applicant: FUJIAN GOLDEN DRAGON RARE-EARTH Co., Ltd., Fujian (CN)

(72) Inventors: Qin Lan, Fujian (CN); Jiaying Huang, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 457 days.

This patent is subject to a terminal disclaimer.

(21) Appl. No.: 17/787,284

(22) PCT Filed: Apr. 20, 2021

(86) PCT No.: PCT/CN2021/088321
§ 371 (c)(1),
(2) Date: Jun. 17, 2022

(87) PCT Pub. No.: WO2021/218702
PCT Pub. Date: Nov. 4, 2021

(65) Prior Publication Data

US 2023/0051707 A1 Feb. 16, 2023

(30) Foreign Application Priority Data

Apr. 30, 2020 (CN) ......................... 202010366533.7

(51) Int. Cl.
*H01F 1/057* (2006.01)
*C22C 33/02* (2006.01)
(Continued)

(52) U.S. Cl.
CPC ....... *H01F 1/0577* (2013.01); *C22C 33/0278* (2013.01); *C22C 38/002* (2013.01);
(Continued)

(58) Field of Classification Search
CPC . C21D 6/007; C22C 2202/02; C22C 33/0278; C22C 38/002; C22C 38/005;
(Continued)

(56) References Cited

U.S. PATENT DOCUMENTS

2020/0013529 A1* 1/2020 Nakamura .............. C22C 38/14
2020/0411236 A1* 12/2020 Kuniyoshi ............ C22C 38/002
(Continued)

FOREIGN PATENT DOCUMENTS

CN 110648813 A 1/2020
CN 110853855 A 2/2020
(Continued)

OTHER PUBLICATIONS

Jul. 26, 2021 International Search Report issued in International Patent Application No. PCT/CN2021/088321.
(Continued)

*Primary Examiner* — Jie Yang
(74) *Attorney, Agent, or Firm* — Houston Beshining Law Office PLLC; Liangang Ye

(57) ABSTRACT

Disclosed are an R-T-B-based permanent magnet material, a preparation method therefor and the use thereof. The R-T-B-based permanent magnet material comprises R, B, M, Fe, Co, X and inevitable impurities, wherein: (1) R is a rare earth element, and the R includes at least Nd and RH, M being one or more of Ti, Zr and Nb, and X including Cu, "Al and/or Ga"; and (2) in percentage by weight, R: 30.5-32.0 wt %, B: 0.95-0.99 wt %, M: 0.3-0.6 wt %, X: 0.8-1.8 wt %, and Cu: 0.35-0.50 wt %, and the balance is Fe, Co and inevitable impurities. According to the present invention, under the
(Continued)

condition of 0.3-0.6 wt % of a high melting point metal, a permanent magnet material with an excellent magnet performance and a good squareness is obtained.

20 Claims, 1 Drawing Sheet

(51) Int. Cl.

| | |
|---|---|
| ***C22C 38/00*** | (2006.01) |
| ***C22C 38/06*** | (2006.01) |
| ***C22C 38/12*** | (2006.01) |
| ***C22C 38/14*** | (2006.01) |
| ***C22C 38/16*** | (2006.01) |

(52) U.S. Cl.

CPC ............ *C22C 38/005* (2013.01); *C22C 38/06* (2013.01); *C22C 38/12* (2013.01); *C22C 38/14* (2013.01); *C22C 38/16* (2013.01); *C22C 2202/02* (2013.01)

(58) Field of Classification Search

CPC ......... C22C 38/06; C22C 38/10; C22C 38/12; C22C 38/14; C22C 38/16; H01F 1/0577; H01F 41/0293

See application file for complete search history.

(56) References Cited

U.S. PATENT DOCUMENTS

| | | | | |
|---|---|---|---|---|
| 2022/0165462 | A1* | 5/2022 | Lan | C22C 38/16 |
| 2022/0293311 | A1 | 9/2022 | Fu et al. | |

FOREIGN PATENT DOCUMENTS

| | | | |
|---|---|---|---|
| CN | 110993234 | A | 4/2020 |
| CN | 111524675 | A | 8/2020 |
| JP | 2014027268 | A | 2/2014 |
| JP | 2017045828 | A | 3/2017 |

OTHER PUBLICATIONS

Jul. 26, 2021 Written Opinion of the International Searching Authority issued in International Patent Application No. PCT/CN2021/088321.

Chinese priority application No. 202010366533.7 (not published).

English translation of Chinese priority application No. 202010366533.7, Apr. 2020.

* cited by examiner

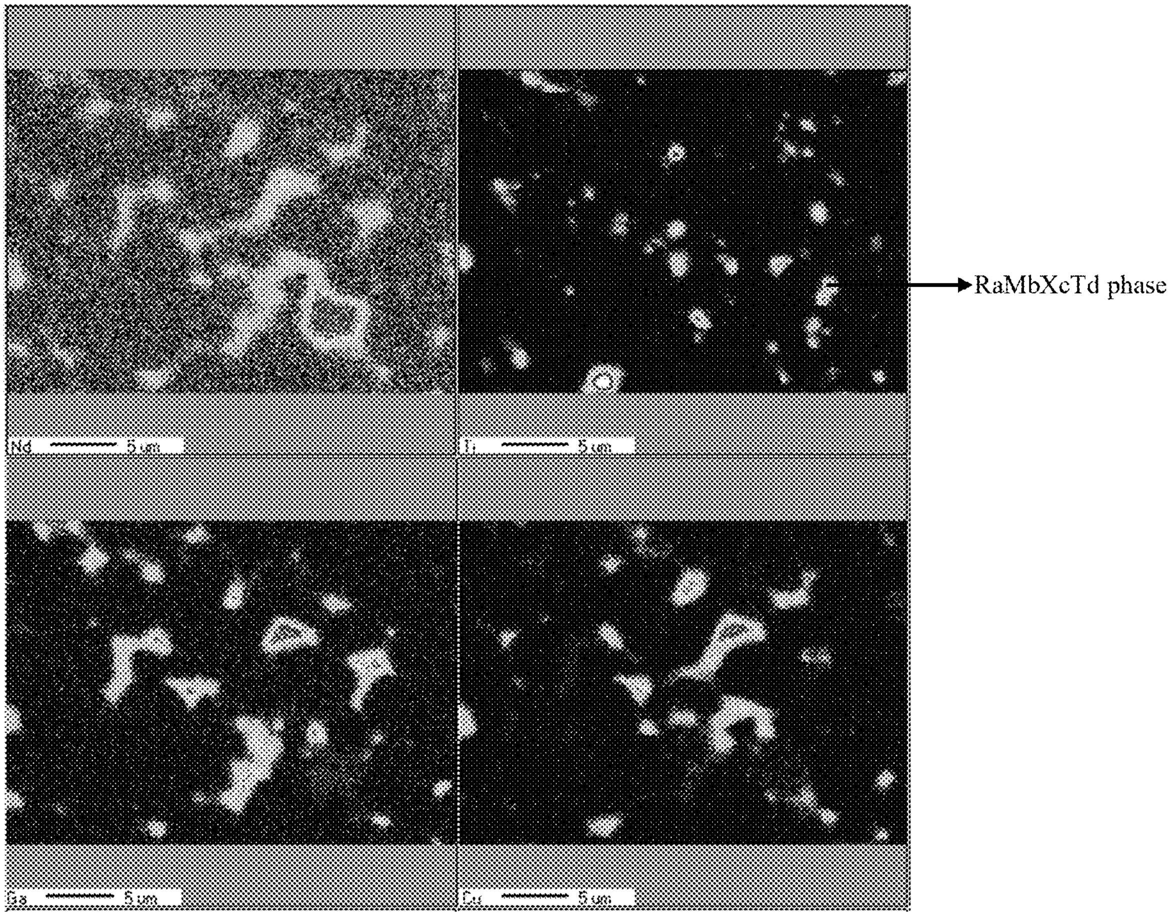
RaMbXcTd phase

R-T-B-BASED PERMANENT MAGNET MATERIAL, PREPARATION METHOD THEREFOR AND USE THEREOF

The present application is a National Stage of International Application No. PCT/CN2021/088321, filed on Apr. 20, 2021, which claims priority of the Chinese Patent Application No. CN202010366533.7 filed on Apr. 30, 2020, the contents of which are incorporated herein by reference in their entireties.

TECHNICAL FIELD

The present invention relates to an R-T-B-based permanent magnet material, a preparation method therefor and the use thereof.

BACKGROUND

For R-T-B-based sintered magnets, usually, sintering temperature is increased or sintering time is prolonged in order to increase sintered density to improve magnetic remanence (Br). However, increasing sintering temperature can easily lead to abnormal grain growth to decrease the magnetic coercivity (Hcj). JPS61295355A and JP2002075717A disclosed that adding elements which can form borides, such as Ti, Zr or other elements, can not only avoid the reduction of coercivity but also improve the sintering density by precipitating the boride at grain boundaries and inhibiting the abnormal growth of grains. However, the following content is also recorded in CN200480001869: due to the existence of boride phase without magnetic force in the sintered magnet, the volume ratio of main phase ($R_2T_{14}B$ compound) is reduced, resulting in the reduction of remanence. The invention inhibits the reduction of coercivity and improves remanence by not generating boride phase.

In the prior art, the improvement of magnetic remanence focuses on the formation of borides or not. However, there is no clear conclusion about the effect of boride at present, so in different literatures, the opposite conclusions of technical effect have been drawn.

Therefore, how to improve the magnetic remanence on the basis of maintaining the coercivity is an urgent technical problem in this field.

CONTENT OF THE PRESENT INVENTION

The technical problem to be solved in the present invention is to overcome the defect of decreasing coercivity caused by the increase of remanence in the R-T-B-based sintered magnet, and thus provide an R-T-B-based permanent magnet material, a preparation method therefor and the use thereof.

In order to overcome the shortcomings of the prior art, the present invention provides an R-T-B-based sintered magnet containing high content of high-melting-point metal and selects a specific content of R, B, M (one or more of Ti, Zr and Nb), X (including Cu, Al and/or Ga), which can improve the density by increasing sintering temperature under the premise of ensuring the main phase volume ratio. So the magnet has high remanence, and higher coercivity obtained by forming a special composition of $R_aM_bX_cT_d$ (T refers to Fe and Co) phase.

The present invention provides an R-T-B-based permanent magnet material, comprising R, B, M, Fe, Co, X and unavoidable impurities, wherein:

(1) R is rare earth element and comprises at least Nd and RH;

M is one or more of Ti, Zr and Nb;

X comprises Cu, "Al and/or Ga";

2) in the R-T-B-based permanent magnet material, by mass percentage:

R: 30.5-32.0 wt %;

B: 0.95-0.99 wt %;

M: 0.3-0.6 wt %;

X: 0.8-1.8 wt %, and Cu: 0.35-0.50 wt %;

the balance being Fe, Co and unavoidable impurities.

In the present invention, the content of R is preferably 30.9-32.0 wt %, such as 30.9 wt %, 31.0 wt %, 31.5 wt % or 32.0 wt %, and the percentage refers to mass percentage in the R-T-B-based permanent magnet material.

In the present invention, R can also include other conventional light rare earth elements in the field, such as Pr.

When the light rare earth element in R is PrNd, the mass ratio of Pr to Nd in PrNd can be 25:75.

In the present invention, the content of Nd is preferably 29.5-31.0 wt %, such as 29.9 wt %, 30.0 wt %, 30.2 wt %, 30.4 wt % or 30.8 wt %, and the percentage refers to mass percentage in the R-T-B-based permanent magnet material.

When the light rare earth element in R is PrNd, the content of PrNd can be 30.0-30.5 wt %, such as 30.2 wt %, and the percentage refers to mass percentage in the R-T-B-based permanent magnet material.

In the present invention, RH can be a conventional heavy rare earth element in the field, such as Dy and/or Th.

In the present invention, the content of the RH is preferably 0.5-2.0 wt %, such as 0.6 wt %, 0.7 wt %, 0.8 wt %, 1.2 wt % or 1.5 wt %, and the percentage refers to mass percentage in the R-T-B-based permanent magnet material.

When RH comprises Th, the content of Th is preferably 0.1-1.0 wt %, such as 0.5 wt %, and the percentage refers to mass percentage in the R-T-B-based permanent magnet material.

When RH comprises Dy, the content of Dy is preferably 0.1-1.5 wt %, such as 0.1 wt %, 0.2 wt %, 0.6 wt %, 0.7 wt %, 0.8 wt %, 1.2 wt % or 1.5 wt %, and the percentage refers to mass percentage in the R-T-B-based permanent magnet material.

In the present invention, X preferably comprises Cu, Al and Ga.

In the present invention, preferably, the content of X is 0.85-1.8 wt %, such as 0.85 wt %, 1.0 wt %, 1.27 wt %, 1.37 wt %, 1.4 wt % or 1.8 wt %, and the percentage refers to mass percentage in the R-T-B-based permanent magnet material.

In the present invention, the content of Cu is preferably 0.4-0.5 wt %, such as 0.4 wt %, 0.42 wt %, 0.45 wt % or 0.5 wt %, and the percentage refers to mass percentage in the R-T-B-based permanent magnet material.

In the present invention, when X comprises Al, the content of Al is preferably 0.3-0.8 wt %, such as 0.3 wt %, 0.4 wt %, 0.6 wt %, 0.7 wt % or 0.8 wt %, and the percentage refers to mass percentage in the R-T-B-based permanent magnet material.

In the present invention, when X comprises Ga, the content of Ga is preferably 0.2-0.5 wt %, such as 0.2 wt %, 0.25 wt %, 0.35 wt % or 0.5 wt %, and the percentage refers to mass percentage in the R-T-B-based permanent magnet material.

In the present invention, preferably, X comprises: Cu: 0.35-0.5 wt %, Al: 0.3-0.8 wt % and Ga: 0.2-0.5 wt %, and the percentage refers to mass percentage in the R-T-B-based permanent magnet material.

In the present invention, preferably, M is Ti, Zr, Nb or "Ti and Zr".

In the present invention, preferably, the content of M is 0.35-0.6 wt %, such as 0.35 wt %, 0.4 wt %, 0.45 wt %, 0.5 wt %, 0.55 wt % or 0.6 wt %, and the percentage refers to mass percentage in the R-T-B-based permanent magnet material.

In the present invention, when M comprises Ti, the content of Ti can be 0.3-0.6 wt %, such as 0.3 wt %, 0.4 wt %, 0.45 wt %, 0.5 wt %, 0.55 wt % or 0.6 wt %, and the percentage refers to mass percentage in the R-T-B-based permanent magnet material.

In the present invention, when M comprises Zr, the content of Zr can be 0.3-0.6 wt %, such as 0.3 wt %, 0.4 wt % or 0.6 wt %, and the percentage refers to mass percentage in the R-T-B-based permanent magnet material.

Ti: 0.3-0.6 wt %, or Zr: 0.3-0.6 wt %, or Nb: 0.35-0.55 wt %;

Cu: 0.35-0.50 wt %;

Al: 0.3-0.8 wt %;

Ga: 0.2-0.5 wt %;

Co: 0.8-2.0 wt %;

the balance being Fe, and the percentage refers to mass percentage in the R-T-B-based permanent magnet material.

In preferred embodiments of the present invention, the R-T-B-based permanent magnet material can be any one of the following numbers 1 to 11 (wt %).

| | wt % | | | | | | | | | | | | | | |
|---|---|---|---|---|---|---|---|---|---|---|---|---|---|---|---|
| No. | R | Nd | PrNd | Tb | Dy | X | Al | Cu | Ga | Cc | B | Ti | Zr | Nb | Fe |
| 1 | 30.9 | 30.2 | / | / | 0.7 | 1.27 | 0.6 | 0.42 | 0.25 | 1.0 | 0.96 | 0.4 | / | / | 65.47 |
| 2 | 30.5 | 29.9 | / | 0.5 | 0.1 | 0.85 | 0.3 | 0.35 | 0.2 | 1.0 | 0.95 | 0.3 | / | / | 66.4 |
| 3 | 31.0 | 30.3 | / | 0.5 | 0.2 | 1.0 | 0.4 | 0.4 | 0.2 | 0.8 | 0.97 | 0.45 | / | / | 65.78 |
| 4 | 31.5 | 30.0 | / | / | 1.5 | 1.4 | 0.6 | 0.45 | 0.35 | 1.2 | 0.98 | 0.5 | / | / | 64.42 |
| 5 | 32.0 | 30.8 | / | / | 1.2 | 1.8 | 0.8 | 0.5 | 0.5 | 1.5 | 0.99 | 0.55 | / | / | 63.16 |
| 6 | 30.9 | / | 30.2 | 0.5 | 0.2 | 1.37 | 0.7 | 0.42 | 0.25 | 2.0 | 0.97 | 0.6 | / | / | 64.16 |
| 7 | 30.9 | 30.2 | / | / | 0.7 | 1.27 | 0.6 | 0.42 | 0.25 | 1.0 | 0.96 | 0.2 | 0.3 | / | 65.37 |
| 8 | 30.5 | 29.9 | / | / | 0.6 | 0.85 | 0.3 | 0.35 | 0.2 | 1.0 | 0.95 | / | 0.4 | / | 66.3 |
| 9 | 30.5 | 29.9 | / | / | 0.6 | 0.85 | 0.3 | 0.35 | 0.2 | 1.0 | 0.95 | / | 0.6 | / | 66.1 |
| 10 | 31.0 | 30.2 | / | / | 0.8 | 1.0 | 0.4 | 0.4 | 0.2 | 0.8 | 0.97 | / | / | 0.35 | 65.88 |
| 11 | 31.0 | 30.2 | / | / | 0.8 | 1.0 | 0.4 | 0.4 | 0.2 | 0.8 | 0.97 | / | / | 0.55 | 65.68 |

In the present invention, when M comprises Nb, the content of Nb can be 0.35-0.55 wt %, such as 0.35 wt % or 0.55 wt %, and the percentage refers to mass percentage in the R-T-B-based permanent magnet material.

In the present invention, when M comprises "Ti and Zr", the content of Ti can be 0.2 wt %, the content of Zr can be 0.3 wt %, and the percentage refers to mass percentage in the R-T-B-based permanent magnet material.

In the present invention, the content of Co is preferably 0.5-2.0 wt %, such as 0.8 wt %, 1.0 wt %, 1.2 wt %, 1.5 wt % or 2.0 wt %, and the percentage refers to mass percentage in the R-T-B-based permanent magnet material.

In the present invention, the content of B is preferably 0.96-0.99 wt %, such as 0.96 wt %, 0.97 wt %, 0.98 wt % or 0.99 wt %, and the percentage refers to the mass percentage in the R-T-B-based permanent magnet material.

In a preferred embodiment of the present invention, the R-T-B-based permanent magnet material comprises the following components:

R: 30.5-32.0 wt %;

B: 0.95-0.99 wt %;

Ti: 0.3-0.6 wt %, or Zr: 0.3-0.6 wt %, or Nb: 0.35-0.55 wt %;

Cu: 0.35-0.50 wt %;

Al: 0.3-0.8 wt %;

Ga: 0.2-0.5 wt %;

Co: 0.8-2.0 wt %;

the balance being Fe, and the percentage refers to mass percentage in the R-T-B-based permanent magnet material.

In a preferred embodiment of the present invention, the R-T-B-based permanent magnet material comprises the following components:

Nd: 29.5-31.0 wt %;

RH: 0.5-2.0 wt %;

B: 0.95-0.99 wt %;

In the present invention, preferably, the R-T-B-based permanent magnet material comprises $R_aM_bX_cT_d$ phase, wherein, T is Fe and Co, 15 at %<a<25 at %, 2.8 at %<b<4.1 at %, 3.0 at %<c<6.0 at %, 68 at %<d<78 at %, and at % refers to atoms percentage in the $R_aM_bX_cT_d$ phase. The existence of this phase can effectively improve the coercivity of the R-T-B permanent magnet material.

The present invention also provides a raw material composition of the R-T-B-based permanent magnet material, which comprises R, B, M, Fe, Co, X and unavoidable impurities, wherein:

(1) R is rare earth element, and R comprises at least Nd and RH;

M is one or more of Ti, Zr and Nb;

X comprises Cu, "Al and/or Ga";

(2) in the R-T-B-based permanent magnet material, by mass percentage:

R: 30.5-32.0 wt %;

B: 0.95-0.99 wt %;

M: 0.3-0.6 wt %;

X: 0.8-1.8 wt %, and Cu: 0.35-0.50 wt %;

the balance being Fe, Co and unavoidable impurities.

In the present invention, the content of R is preferably 30.9-32.0 wt %, such as 30.9 wt %, 31.0 wt %, 31.5 wt % or 32.0 wt %, and the percentage refers to mass percentage in the raw material composition of the R-T-B-based permanent magnet material.

In the present invention, R can also comprise other conventional light rare earth elements in the field, such as Pr.

When the light rare earth element in R is PrNd, the mass ratio of Pr to Nd in PrNd can be 25:75.

In the present invention, the content of Nd is preferably 29.5-31.0 wt %, such as 29.9 wt %, 30.0 wt %, 30.2 wt %, 30.3 wt % or 30.8 wt %, and the percentage refers to mass percentage in the raw material composition of the R-T-B-based permanent magnet material.

When the light rare earth element in R is PrNd, the content of PrNd can be 30.0-30.5 wt %, such as 30.2 wt %, and the percentage refers to mass percentage in the raw material composition of the R-T-B-based permanent magnet material.

In the present invention, RH can be conventional heavy rare earth elements in the field, such as Dy and/or Th.

In the present invention, the content of RH is preferably 0.5-2.0 wt %, such as 0.6 wt %, 0.7 wt %, 0.8 wt %, 1.2 wt % or 1.5 wt %, and the percentage refers to mass percentage in the raw material composition of the R-T-B-based permanent magnet material.

When Th is included in RH, it is preferred that the content of Th is 0.1-1.0 wt %, such as 0.5 wt %, and the percentage refers to mass percentage in the raw material composition of the R-T-B-based permanent magnet material.

When Dy is included in RH, it is preferred that the content of Dy is 0.1-1.5 wt %, such as 0.1 wt %, 0.2 wt %, 0.6 wt %, 0.7 wt %, 0.8 wt %, 1.2 wt % or 1.5 wt %, and the percentage refers to mass percentage in the raw material composition of the R-T-B-based permanent magnet material.

A person skilled in the art knows that RH can be introduced during smelting and/or grain boundary diffusion.

Herein, the content of RH introduced in the smelting can be 0.1-1.0 wt %, such as 0.1 wt %, 0.2 wt %, 0.3 wt %, 0.6 wt %, 0.7 wt % or 1.0 wt %, and the percentage refers to mass percentage in the raw material composition of the R-T-B-based permanent magnet material.

Herein, the content of RH introduced in the grain boundary diffusion process can be 0.1-1.0 wt %, such as, 0.5 wt %, and the percentage refers to mass percentage in the raw material composition of the R-T-B-based permanent magnet material.

In the present invention, X preferably comprises Cu, Al and Ga.

In the present invention, the content of X is preferably 0.85-1.8 wt %, such as 0.85 wt %, 1.0 wt %, 1.27 wt %, 1.37 wt %, 1.4 wt % or 1.8 wt %, and the percentage refers to mass percentage in the raw material composition of the R-T-B-based permanent magnet material.

In the present invention, the content of Cu is preferably 0.4-0.5 wt %, such as 0.4 wt %, 0.42 wt %, 0.45 wt % or 0.5 wt %, and the percentage refers to the mass percentage in the raw material composition of the raw material composition of R-T-B-based permanent magnet material.

In the present invention, when X comprises Al, the content of Al is preferably 0.3-0.8 wt %, such as 0.3 wt %, 0.4 wt %, 0.6 wt %, 0.7 wt % or 0.8 wt %, and the percentage refers to mass percentage in the raw material composition of the R-T-B-based permanent magnet material.

In the present invention, when X comprises Ga, the content of Ga is preferably 0.2-0.5 wt %, such as 0.2 wt %, 0.25 wt %, 0.35 wt % or 0.5 wt %, and the percentage refers to mass percentage in the raw material composition of the R-T-B-based permanent magnet material.

In the present invention, preferably, X comprises: Cu: 0.35-0.5 wt %, Al: 0.3-0.8 wt %, Ga: 0.2-0.5 wt %, and the percentage refers to mass percentage in the raw material composition of the R-T-B-based permanent magnet material.

In the present invention, preferably, M is Ti, Zr, Nb or "Ti and Zr".

In the present invention, preferably, the content of M is 0.35-0.6 wt %, such as 0.35 wt %, 0.4 wt %, 0.45 wt %, 0.5 wt %, 0.55 wt % or 0.6 wt %, and the percentage refers to mass percentage in the raw material composition of the R-T-B-based permanent magnet material.

In the present invention, when M comprises Ti, the content of Ti can be 0.3-0.6 wt %, such as 0.3 wt %, 0.4 wt %, 0.45 wt %, 0.5 wt %, 0.55 wt % or 0.6 wt %, and the percentage refers to mass percentage in the raw material composition of the R-T-B-based permanent magnet material.

In the present invention, when M comprises Zr, the content of Zr can be 0.3-0.6 wt %, such as 0.3 wt %, 0.4 wt % or 0.6 wt %, and the percentage refers to mass percentage in the raw material composition of the R-T-B-based permanent magnet material.

In the present invention, when M comprises Nb, the content of Nb can be 0.35-0.55 wt %, such as 0.35 wt % or 0.55 wt %, and the percentage refers to mass percentage in the raw material composition of the R-T-B-based permanent magnet material.

In the present invention, when M comprises "Ti and Zr", the content of Ti can be 0.2 wt %, and the content of the Zr can be 0.3 wt %, and the percentage refers to mass percentage in the raw material composition of the R-T-B-based permanent magnet material.

In the present invention, the content of Co is preferably 0.50-2.0 wt %, such as 0.8 wt %, 1.0 wt %, 1.2 wt %, 1.5 wt % or 2.0 wt %, and the percentage refers to mass percentage in the raw material composition of the R-T-B-based permanent magnet material.

In the present invention, the content of B is preferably 0.96-0.99 wt %, such as 0.96 wt %, 0.97 wt %, 0.98 wt % or 0.99 wt %, and the percentage refers to mass percentage in the raw material composition of the R-T-B-based permanent magnet material.

In a preferred embodiment of the present invention, the R-T-B-based permanent magnet material comprises the following components:

R: 30.5-32.0 wt %;
B: 0.95-0.99 wt %;
Ti: 0.3-0.6 wt %, or Zr: 0.3-0.6 wt %, or Nb: 0.35-0.55 wt %;
Cu: 0.35-0.50 wt %;
Al: 0.3-0.8 wt %;
Ga: 0.2-0.5 wt %;
Co: 0.8-2.0 wt %;
the balance being Fe, and the percentage refers to mass percentage in the raw material composition of the R-T-B-based permanent magnet material.

In a preferred embodiment of the present invention, the R-T-B-based permanent magnet material comprises the following components:

Nd: 29.5-31.0 wt %;
RH: 0.5-2.0 wt %;
B: 0.95-0.99 wt %;
Ti: 0.3-0.6 wt %, or Zr: 0.3-0.6 wt %, or Nb: 0.35-0.55 wt %;
Cu: 0.35-0.50 wt %;
Al: 0.3-0.8 wt %;
Ga: 0.2-0.5 wt %;
Co: 0.8-2.0 wt %;
the balance being Fe, and the percentage refers to mass percentage in the raw material composition of the R-T-B-based permanent magnet material.

In preferred embodiments of the present invention, the raw material composition of the R-T-B-based permanent magnet material can be any one of the following numbers 1 to 11 (wt %).

| | wt % | | | | | | | | | | | | | | | |
|---|---|---|---|---|---|---|---|---|---|---|---|---|---|---|---|---|
| No. | R | Nd | PrNd | Tb (smelting) | Dy (smelting) | Tb (diffusion) | Dy (diffusion) | X | Al | Cu | Ga | Co | B | Ti | Zr | Nb | Fe |
| 1 | 30.9 | 30.2 | / | / | 0.2 | 0 | 0.5 | 1.27 | 0.6 | 0.42 | 0.25 | 1.0 | 0.96 | 0.4 | / | / | 65.47 |
| 2 | 30.5 | 29.9 | / | | 0.1 | 0.5 | 0 | 0.85 | 0.3 | 0.35 | 0.2 | 1.0 | 0.95 | 0.3 | / | / | 66.4 |
| 3 | 31.0 | 30.3 | / | | 0.2 | 0.5 | 0 | 1.0 | 0.4 | 0.4 | 0.2 | 0.8 | 0.97 | 0.45 | / | / | 65.78 |
| 4 | 31.5 | 30.0 | / | / | 1.0 | 0 | 0.5 | 1.4 | 0.6 | 0.45 | 0.35 | 1.2 | 0.98 | 0.5 | / | / | 64.42 |
| 5 | 32.0 | 30.8 | / | / | 0.7 | 0 | 0.5 | 1.8 | 0.8 | 0.5 | 0.5 | 1.5 | 0.99 | 0.55 | / | / | 63.16 |
| 6 | 30.9 | / | 30.2 | 0 | 0.2 | 0.5 | 0 | 1.37 | 0.7 | 0.42 | 0.25 | 2.0 | 0.97 | 0.6 | / | / | 64.16 |
| 7 | 30.9 | 30.2 | / | / | 0.2 | 0 | 0.5 | 1.27 | 0.6 | 0.42 | 0.25 | 1.0 | 0.96 | 0.2 | 0.3 | / | 65.37 |
| 8 | 30.5 | 29.9 | / | / | 0.1 | 0 | 0.5 | 0.85 | 0.3 | 0.35 | 0.2 | 1.0 | 0.95 | / | 0.4 | / | 66.3 |
| 9 | 30.5 | 29.9 | / | / | 0.1 | 0 | 0.5 | 0.85 | 0.3 | 0.35 | 0.2 | 1.0 | 0.95 | / | 0.6 | / | 66.1 |
| 10 | 31.0 | 30.2 | / | / | 0.3 | 0 | 0.5 | 1.0 | 0.4 | 0.4 | 0.2 | 0.8 | 0.97 | / | / | 0.35 | 65.88 |
| 11 | 31.0 | 30.2 | / | / | 0.3 | 0 | 0.5 | 1.0 | 0.4 | 0.4 | 0.2 | 0.8 | 0.97 | / | / | 0.55 | 65.68 |

The present invention also provides a preparation method for the R-T-B-based permanent magnet material, wherein, the preparation method comprises the following steps: the molten liquid of the raw material composition of the R-T-B-based permanent magnet material as described above is subjected to casting, crushing, pulverizing, forming, sintering and grain boundary diffusion treatment, and the R-T-B-based permanent magnet material is obtained.

In the present invention, the molten liquid of the raw material composition of the R-T-B-based permanent magnet material can be obtained by the conventional method in the field, such as smelting in a high-frequency vacuum induction smelting furnace. Herein, the vacuum degree in the smelting furnace can be $5\times10^{-2}$ Pa; and the temperature of the smelting can be 1500° C. or less.

In the present invention, the process of the casting can be a conventional casting process in the field, such as in an Ar gas atmosphere, for example in an Ar gas atmosphere with $5\times10^{-2}$ Pa, cooling at a rate of $10^{2}$° C./sec-$10^{4}$° C./sec.

In the present invention, the process of the crushing can be a conventional crushing process in the field, for example, comprises hydrogen absorption, dehydrogenation and cooling treatment.

Herein, the hydrogen absorption is preferably carried out under hydrogen pressure of 0.15 MPa.

Herein, the dehydrogenation can be carried out under the condition of vacuumizing while raising temperature.

In the present invention, the process of the pulverizing can be a conventional pulverizing process in the field, such as jet milling.

Herein, the jet milling can be carried out in nitrogen atmosphere where the content of the oxidizing gas is 150 ppm or less. Herein, the oxidizing gas refers to the content of oxygen or moisture.

Herein, the pressure in the pulverizing chamber of the jet milling can be 0.38 MPa.

Herein, the time of the jet milling can be 3 hours.

Herein, after the pulverizing, lubricants can be added according to the conventional method in the field, such as zinc stearate. The amount of the lubricant to be added can be 0.10-0.15%, such as 0.12%, of the weight of the mixed powder.

In the present invention, the process of the forming can be a conventional forming process in the field, such as magnetic field forming method or a hot pressing and heat deforming method.

In the present invention, the process of the sintering can be a conventional sintering process in the field, such as, preheating, sintering and cooling in vacuum conditions (such as under the pressure of $5\times10^{-3}$ Pa).

Herein, the temperature of the preheating can be 300-600° C. The time of the preheating can be 1-2 h. Preferably, the preheating is at 300° C. and 600° C. for 1 h, respectively.

Herein, the temperature of the sintering can be a conventional sintering temperature in the field, such as 900° C.-1100° C., e.g. 1040° C.

Herein, the time of the sintering can be a conventional sintering time in the field, such as 6 h.

Herein, before the cooling, Ar gas can be feed to make the pressure reach 0.1 Mpa.

In the present invention, the grain boundary diffusion treatment can be carried out according to the conventional process in the field, for example, a substance containing Dy and/or Tb is adhered to the surface of the R-T-B-based permanent magnet material by vaporizing, coating or sputtering, and diffusion heat treatment is carried out.

Herein, the substance containing Tb can be a Tb metal, a Tb-containing compound, or a Tb-containing alloy (such as $TbF_3$).

Herein, the substance containing Dy can be a Dy metal, a Dy-containing compound, or a Dy-containing alloy (such as $DyF_3$).

Herein, the temperature of the diffusion heat treatment can be 800-900° C., such as, 850° C.

Herein, the time of the diffusion heat treatment can be 12-48 h, such as 24 h.

Herein, after the grain boundary diffusion treatment, heat treatment can also be carried out. The temperature of the heat treatment can be 450-550° C., such as, 500° C. The time of the heat treatment can be 3 h.

The present invention also provides an R-T-B-based permanent magnet material prepared by the preparation method as described above.

The present invention also provides a use of the R-T-B-based permanent magnet material as an electronic component in a motor.

Herein, the use can be in electronic components of high speed motors and/or household appliances.

In the present invention, Nd refers to neodymium, Pr refers to praseodymium, RH refers to terbium, Dy refers to dysprosium, Fe refers to iron, Co refers to cobalt, B refers to boron, Al refers to aluminum, Cu refers to copper, Nb refers to niobium, Ni refers to nickel, Zn refers to zinc, Ga refers to gallium, Ag refers to silver, In refers to indium, Sn refers to tin, Bi refers to bismuth, Ti refers to titanium, V refers to vanadium, Cr refers to chromium, Zr refers to zirconium, Mo refers to molybdenum, Hf refers to hafnium, $T_d$ refers to tantalum, W refers to tungsten, Mn refers to manganese, C refers to carbon, O refers to oxygen, and N refers to nitrogen.

Based on the common sense in the field, the preferred conditions of the preparation methods can be combined arbitrarily to obtain preferred examples of the present invention.

The reagents and raw materials used in the present invention are commercially available.

The positive progress of the present invention are as follows:

(1) The R-T-B-based magnet material in the present invention has excellent performance with Br≥13.09 kGs, Hcj≥25.2 kOe, achieving simultaneous improvement of Br and Hcj.

(2) Compared with the conventional formula, the content of high-melting-point metal in the R-T-B permanent magnet material in the present invention is higher, and the high content of high-melting-point metal can form $R_aM_bX_cT_d$, overcoming the deterioration of magnetic performance caused by the content increase of conventional high-melting-point metal, and improves the sintering property of the R-T-B-based magnets. Hcj is equivalent to that of the conventional formula, and the squareness of magnets is effectively improved.

BRIEF DESCRIPTION OF THE DRAWINGS

FIG. 1 shows the distribution of Nd, Ti, Ga and Cu formed by FE-EPMA plane scanning of the sintered magnet prepared in Example 1, where $R_aM_bX_cT_d$ phase is marked with the arrow.

DETAILED DESCRIPTION OF THE PREFERRED EMBODIMENT

The following examples further illustrate the present invention, but the present invention is not limited thereto. Experiment methods in which specific conditions are not indicated in the following embodiments are selected according to conventional methods and conditions, or according to the product specification.

The formulations of the R-T-B-based sintered magnet in examples and comparative examples are shown in Table 1.

TABLE 1

| No. | wt % | | | | | | | | | | | | | | | | |
|---|---|---|---|---|---|---|---|---|---|---|---|---|---|---|---|---|---|
| | R | Nd | PrNd | Tb (smelting) | Dy (smelting) | Tb (diffusion) | Dy (diffusion) | X | Al | Cu | Ga | Co | B | Ti | Zr | Nb | Fe |
| Example 1 | 30.9 | 30.2 | / | / | 0.2 | / | 0.5 | 1.27 | 0.6 | 0.42 | 0.25 | 1.0 | 0.96 | 0.4 | | / | 65.47 |
| Example 2 | 30.5 | 29.9 | / | / | 0.1 | 0.5 | / | 0.85 | 0.3 | 0.35 | 0.2 | 1.0 | 0.95 | 0.3 | / | / | 66.4 |
| Example 3 | 31.0 | 30.3 | / | / | 0.2 | 0.5 | / | 1.0 | 0.4 | 0.4 | 0.2 | 0.8 | 0.97 | 0.45 | / | / | 65.78 |
| Example 4 | 31.5 | 30.0 | / | / | 1.0 | / | 0.5 | 1.4 | 0.6 | 0.45 | 0.35 | 1.2 | 0.98 | 0.5 | / | / | 64.42 |
| Example 5 | 32.0 | 30.8 | / | / | 0.7 | / | 0.5 | 1.8 | 0.8 | 0.5 | 0.5 | 1.5 | 0.99 | 0.55 | / | / | 63.16 |
| Example 6 | 30.9 | / | 30.2 | 0 | 0.2 | 0.5 | / | 1.37 | 0.7 | 0.42 | 0.25 | 2.0 | 0.97 | 0.6 | / | / | 64.16 |
| Example 7 | 30.9 | 30.2 | / | / | 0.2 | / | 0.5 | 1.27 | 0.6 | 0.42 | 0.25 | 1.0 | 0.96 | 0.2 | 0.3 | / | 65.37 |
| Example 8 | 30.5 | 29.9 | / | / | 0.1 | / | 0.5 | 0.85 | 0.3 | 0.35 | 0.2 | 1.0 | 0.95 | / | 0.4 | / | 66.3 |
| Example 9 | 30.5 | 29.9 | / | / | 0.1 | / | 0.5 | 0.85 | 0.3 | 0.35 | 0.2 | 1.0 | 0.95 | / | 0.6 | / | 66.1 |
| Example 10 | 31.0 | 30.2 | / | / | 0.3 | / | 0.5 | 1.0 | 0.4 | 0.4 | 0.2 | 0.8 | 0.97 | | / | 0.35 | 65.88 |
| Example 11 | 31.0 | 30.2 | / | / | 0.3 | / | 0.5 | 1.0 | 0.4 | 0.4 | 0.2 | 0.8 | 0.97 | / | / | 0.55 | 65.68 |
| Comparative Example 1 | 30.5 | 29.9 | / | / | 0.1 | / | 0.5 | 0.85 | 0.3 | 0.35 | 0.2 | 1.0 | 0.95 | 0 | / | / | 66.7 |
| Comparative Example 2 | 30.5 | 29.9 | / | / | 0.1 | / | 0.5 | 0.85 | 0.3 | 0.35 | 0.2 | 1.0 | 0.95 | 0.7 | / | / | 66.0 |
| Comparative Example 3 | 31.5 | 30.5 | / | / | 0.5 | / | 0.5 | 1.1 | 0.6 | 0.25 | 0.25 | 1.2 | 0.98 | 0.4 | / | / | 64.82 |
| Comparative Example 4 | 31.5 | 30.5 | / | / | 0.5 | / | 0.5 | 0.7 | 0.2 | 0.35 | 0.15 | 1.2 | 0.98 | 0.4 | / | / | 65.22 |
| Comparative Example 5 | 31.5 | 30.5 | / | / | 0.5 | / | 0.5 | 1.45 | 0.6 | 0.6 | 0.25 | 1.2 | 0.98 | 0.4 | / | / | 64.47 |
| Comparative Example 6 | 31.5 | 30.5 | / | / | 0.5 | / | 0.5 | 0.95 | 0.5 | 0.2 | 0.25 | 1.2 | 0.98 | 0.4 | / | / | 64.97 |
| Comparative Example 7 | 30.9 | 30.2 | / | / | 0.2 | / | 0.5 | 1.27 | 0.6 | 0.42 | 0.25 | 1.0 | 0.94 | 0.4 | / | / | 65.49 |
| Comparative Example 8 | 30.9 | 30.2 | / | / | 0.2 | / | 0.5 | 1.27 | 0.6 | 0.42 | 0.25 | 1.0 | 1.02 | 0.4 | / | / | 65.41 |
| Comparative Example 9 | 30.0 | 29.0 | / | / | 0.5 | / | 0.5 | 1.25 | 0.6 | 0.4 | 0.25 | 1.2 | 0.98 | 0.5 | / | / | 66.07 |
| Comparative Example 10 | 32.5 | 31.5 | / | / | 0.5 | / | 0.5 | 1.25 | 0.6 | 0.4 | 0.25 | 1.2 | 0.98 | 0.5 | / | / | 63.57 |

Note: Pr:Nd=25:75 (mass ratio) in PrNd; smelting refers to introducing in process step (1), diffusion refers to introducing in process step (8); X refers to the sum of content of Cu, Al and Ga; and "/" indicates that the element is not added.

The R-T-B-based sintered magnets were prepared as follows:

(1) Smelting process: according to the formulations shown in Table 1, the prepared raw materials were put into a crucible made of alumina and vacuum smelted in a high-frequency vacuum induction smelting furnace and in a vacuum of $5\times10^{-2}$ Pa at a temperature of 1500° C. or less.

(2) Casting process: after vacuum smelting, the smelting furnace was fed with Ar gas to make the air pressure reach 55,000 Pa and then casting was carried out, and the quenching alloy was obtained at the cooling rate of $10^{2}$° C./sec-$10^{4}$° C./sec.

(3) Hydrogen decrepitation process: the furnace for hydrogen decrepitation with quenching alloy placed therein was vacuumed at room temperature, and then hydrogen gas with 99.9% purity was passed into the furnace for hydrogen decrepitation to maintain the hydrogen pressure at 0.15 MPa; after sufficient hydrogen absorption, it was sufficiently dehydrogenated by raising temperature while vacuuming; then it was cooled and the powder after hydrogen decrepitation was taken out.

(4) Micro-pulverization process: the powder after hydrogen decrepitation was pulverized by jet mill for 3 hours in nitrogen atmosphere with oxidizing gas content of 150 ppm or less and under the condition of the pressure of 0.38 MPa in the pulverization chamber, and fine powder was obtained. The oxidizing gas refers to oxygen or moisture.

(5) Zinc stearate was added to the powder after jet mill pulverization, and the addition amount of zinc stearate was 0.12% by weight of the mixed powder, and then it was mixed thoroughly by using a V-mixer.

(6) Magnetic field forming process: a rectangular oriented magnetic field forming machine was used to conduct primary forming of the above-mentioned powder with zinc stearate into a cube with sides of 25 mm at one time in an orientation magnetic field of 1.6 T and a forming pressure of 0.35 ton/$cm^2$; after the primary forming, it was demagnetized in a magnetic field of 0.2 T. In order to prevent the formed body after the primary forming from air contact, it was sealed, and then secondary forming was carried out at a pressure of 1.3 ton/$cm^2$ using a secondary forming machine (isostatic forming machine).

(7) Sintering process: each formed body was moved into a sintering furnace for sintering, and the sintering was maintained under a vacuum of $5\times10^{-3}$ Pa and at a temperature of 300° C. and 600° C. for 1 hour, respectively; then, sintered at a temperature of 1040° C. for 2 hours; and then Ar gas was passed in to make the air pressure reach 0.1 MPa, and cooled to room temperature.

(8) Grain boundary diffusion treatment process: the sintered body of each group was processed into a magnet with a diameter of 20 mm and a thickness of 5 mm, and the thickness direction is the magnetic field orientation direction, after the surface was cleaned, the raw materials formulated with $TbF_3$ or $DyF_3$ were used respectively to coat on the magnet through a full spray, and the coated magnet was dried, and diffusion heat treatment was carried out at a temperature of 850° C. for 24 hours in a high-purity Ar gas atmosphere. Cooled to room temperature.

$TbF_3$ was sprayed in examples 2, 3 and 6, and $DyF_3$ was sprayed in the remaining examples and comparative examples.

(9) Heat treatment process: the sintered body was heat treated in high purity Ar gas at a temperature of 500° C. for 3 hours and then cooled to room temperature and taken out.

Effectiveness Example

The magnetic properties and compositions of the R-T-B-based sintered magnet prepared in Examples 1-11 and Comparative Examples 1-10 were measured, and the microscopic structure of the magnets was observed using FE-EPMA.

(1) Composition measurement: compositions were measured with high frequency inductively coupled plasma emission spectrometer (CP-OES). Table 2 below shows the composition results.

TABLE 2

| | wt % | | | | | | | | | | | | | | |
|---|---|---|---|---|---|---|---|---|---|---|---|---|---|---|---|
| NO. | R | Nd | PrNd | Tb | Dy | X | Al | Cu | Ga | Co | B | Ti | Zr | Nb | Fe |
| Example 1 | 30.9 | 30.2 | / | / | 0.7 | 1.27 | 0.6 | 0.42 | 0.25 | 1.0 | 0.96 | 0.4 | / | / | 65.47 |
| Example 2 | 30.5 | 29.9 | / | 0.5 | 0.1 | 0.85 | 0.3 | 0.35 | 0.2 | 1.0 | 0.95 | 0.3 | / | / | 66.4 |
| Example 3 | 31.0 | 30.3 | / | 0.5 | 0.2 | 1.0 | 0.4 | 0.4 | 0.2 | 0.8 | 0.97 | 0.45 | / | / | 65.78 |
| Example 4 | 31.5 | 30.0 | / | / | 1.5 | 1.4 | 0.6 | 0.45 | 0.35 | 1.2 | 0.98 | 0.5 | / | / | 64.42 |
| Example 5 | 32.0 | 30.8 | / | / | 1.2 | 1.8 | 0.8 | 0.5 | 0.5 | 1.5 | 0.99 | 0.55 | / | / | 63.16 |
| Example 6 | 30.9 | / | 30.2 | 0.5 | 0.2 | 1.37 | 0.7 | 0.42 | 0.25 | 2.0 | 0.97 | 0.6 | / | / | 64.16 |
| Example 7 | 30.9 | 30.2 | / | / | 0.7 | 1.27 | 0.6 | 0.42 | 0.25 | 1.0 | 0.96 | 0.2 | 0.3 | / | 65.37 |
| Example 8 | 30.5 | 29.9 | / | / | 0.6 | 0.85 | 0.3 | 0.35 | 0.2 | 1.0 | 0.95 | / | 0.4 | / | 66.3 |
| Example 9 | 30.5 | 29.9 | / | / | 0.6 | 0.85 | 0.3 | 0.35 | 0.2 | 1.0 | 0.95 | / | 0.6 | / | 66.1 |
| Example 10 | 31.0 | 30.2 | / | / | 0.8 | 1.0 | 0.4 | 0.4 | 0.2 | 0.8 | 0.97 | / | / | 0.35 | 65.88 |
| Example 11 | 31.0 | 30.2 | / | / | 0.8 | 1.0 | 0.4 | 0.4 | 0.2 | 0.8 | 0.97 | / | / | 0.55 | 65.68 |
| Comparative Example 1 | 30.5 | 29.9 | / | / | 0.6 | 0.85 | 0.3 | 0.35 | 0.2 | 1.0 | 0.95 | 0 | / | / | 66.7 |
| Comparative Example 2 | 30.5 | 29.9 | / | / | 0.6 | 0.85 | 0.3 | 0.35 | 0.2 | 1.0 | 0.95 | 0.7 | / | / | 66.0 |
| Comparative Example 3 | 31.5 | 30.5 | / | / | 1.0 | 1.1 | 0.6 | 0.25 | 0.25 | 1.2 | 0.98 | 0.4 | / | / | 64.82 |
| Comparative Example 4 | 31.5 | 30.5 | / | / | 1.0 | 0.7 | 0.2 | 0.35 | 0.15 | 1.2 | 0.98 | 0.4 | / | | 65.22 |
| Comparative Example 5 | 31.5 | 30.5 | / | / | 1.0 | 1.45 | 0.6 | 0.6 | 0.25 | 1.2 | 0.98 | 0.4 | / | / | 64.47 |
| Comparative Example 6 | 31.5 | 30.5 | / | / | 1.0 | 0.95 | 0.5 | 0.2 | 0.25 | 1.2 | 0.98 | 0.4 | / | / | 64.97 |

TABLE 2-continued

| NO. | wt % | | | | | | | | | | | | | | |
|---|---|---|---|---|---|---|---|---|---|---|---|---|---|---|---|
| | R | Nd | PrNd | Tb | Dy | X | Al | Cu | Ga | Co | B | Ti | Zr | Nb | Fe |
| Comparative Example 7 | 30.9 | 30.2 | / | / | 0.7 | 1.27 | 0.6 | 0.42 | 0.25 | 1.0 | 0.94 | 0.4 | / | / | 65.49 |
| Comparative Example 8 | 30.9 | 30.2 | / | / | 0.7 | 1.27 | 0.6 | 0.42 | 0.25 | 1.0 | 1.02 | 0.4 | / | / | 65.41 |
| Comparative Example 9 | 30.0 | 29.0 | / | / | 1.0 | 1.25 | 0.6 | 0.4 | 0.25 | 1.2 | 0.98 | 0.5 | / | / | 66.07 |
| Comparative Example 10 | 32.5 | 31.5 | / | / | 1.0 | 1.25 | 0.6 | 0.4 | 0.25 | 1.2 | 0.98 | 0.5 | / | / | 63.57 |

(2) Magnetic properties evaluation: the magnetic properties were examined using the NIM-10000H type BH bulk rare earth permanent magnet nondestructive measurement system in National Institute of Metrology, China. The following Table 3 indicates the magnetic property testing results.

TABLE 3

| NO. | Br (kGs) | Hcj (kOe) | SQ | Bhmax (Mgoe) |
|---|---|---|---|---|
| Example 1 | 13.33 | 25.2 | 99.1 | 43.1 |
| Example 2 | 13.40 | 27.2 | 99.2 | 43.3 |
| Example 3 | 13.26 | 27.5 | 99.5 | 42.4 |
| Example 4 | 13.11 | 26.3 | 99.4 | 41.9 |
| Example 5 | 13.09 | 26.0 | 99.3 | 41.7 |
| Example 6 | 13.38 | 27.8 | 99.8 | 41.6 |
| Example 7 | 13.28 | 25.5 | 99.5 | 41.2 |
| Example 8 | 13.3 | 25.8 | 99.6 | 42.9 |
| Example 9 | 13.31 | 25.3 | 99.4 | 43.1 |
| Example 10 | 13.27 | 25.9 | 99.2 | 42.7 |
| Example 11 | 13.24 | 25.2 | 99.1 | 42.5 |
| Comparative Example 1 | 13.33 | 24.7 | 91.5 | 41.8 |
| Comparative Example 2 | 13.28 | 23.3 | 99.1 | 42.8 |
| Comparative Example 3 | 13.3 | 22.8 | 99.0 | 42.9 |
| Comparative Example 4 | 13.53 | 22.9 | 99.2 | 44.5 |
| Comparative Example 5 | 13.13 | 22.6 | 99.3 | 41.8 |
| Comparative Example 6 | 13.34 | 22.8 | 99.5 | 43.2 |
| Comparative Example 7 | 13.03 | 22.4 | 96.6 | 40.2 |
| Comparative Example 8 | 13.44 | 23.0 | 99.8 | 43.8 |

TABLE 3-continued

| NO. | Br (kGs) | Hcj (kOe) | SQ | Bhmax (Mgoe) |
|---|---|---|---|---|
| Comparative Example 9 | 13.46 | 22.3 | 97.8 | 43.5 |
| Comparative Example 10 | 12.98 | 23.8 | 99.4 | 40.6 |

Table 3 shows that:

i. The R-T-B-based permanent magnet materials of the present invention have excellent performance with Br≥13.09 kGs and Hcj≥25.2 kOe (Example 1-1);

ii. Based on the formula of the present invention, as the amount of raw materials M, X, Cu, R and B is changed, the performance of the R-T-B-based permanent magnet materials decreases significantly and can not achieve the performance of the present invention (comparative example 1-10).

(3) FE-EPMA inspection: the perpendicularly oriented surface of the sintered magnet material was polished and inspected using a field emission electron probe micro-analyzer (FE-EPMA) (Japan Electronics Corporation (JEOL), 8530F). The distribution of R, Fe, Co, Ti, Nb, Zr, B, Al, Cu, Ga and other elements in the magnet material was first determined by FE-EPMA surface scanning, and then the content of R, Fe, Co, Al, Cu, Ga, Ti, Nb, Zr and other elements in the R-M-X-T phase was determined by FE-EPMA single-point quantitative analysis with the test conditions of acceleration voltage 15 kv and probe beam current 50 nA.

The FE-EPMA inspection was performed on the sintered magnet material prepared in Example 1, and the results are shown in Table 4 below.

Table 4 shows the results of FE-EPMA single-point quantitative analysis of the R-M-X-T-rich phase in FIG. 1. From Table 4, it can be seen that, in the R-M-X-T-rich phase, R is about 19.98 at %, M is about 3.03 at %, X is about 5.46 at %, and T is about 71.54 at %.

TABLE 4

| R | | T | | X | | | M | |
|---|---|---|---|---|---|---|---|---|
| Nd | Dy | Fe | Co | Ga | Cu | Al | Ti | phase component |
| 19.07 | 0.91 | 71.41 | 0.13 | 4.21 | 1.17 | 0.08 | 3.03 | $R_{19.98}M_{3.03}X_{5.46}T_{71.54}$ |

What is claimed is:

1. An R-T-B-based permanent magnet material, which comprises R, B, M, Fe, Co, X and unavoidable impurities, wherein:

(1) R is rare earth element and comprises at least Nd and RH; RH is heavy rare earth element; the content of RH is 0.6-2.0 wt %;

M is at least one element selected from the group consisting of Ti, Zr and Nb;

X comprises (a) Cu and Ga, or (b) Cu, Al and Ga;

(2) in the R-T-B-based permanent magnet material, by mass percentage:

R: 30.5-32.0 wt %;

B: 0.95-0.99 wt %;

M: 0.3-0.6 wt %;

X: 0.8-1.8 wt %, and Cu: 0.35-0.50 wt %;

the balance being Fe, Co and unavoidable impurities;

wherein, the R-T-B-based permanent magnet material comprises $R_aM_bX_cT_d$ phase, wherein, T is Fe and Co, 15 at %<a<25 at %, 2.8 at %<b<4.1 at %, 3.0 at %<c<6.0 at %, 68 at %<d<78 at %, and at % refers to atoms percentage in the $R_aM_bX_cT_d$ phase.

2. An electronic component in a motor comprising the R-T-B permanent magnet material according to claim 1.

3. The R-T-B permanent magnet material according to claim 1, wherein, X comprises Cu, Al and Ga.

4. The R-T-B permanent magnet material according to claim 3, wherein, the content of Al is 0.3-0.8 wt %, the content of Ga is 0.2-0.5 wt %, and the percentage refers to mass percentage in the R-T-B-based permanent magnet material.

5. The R-T-B permanent magnet material according to claim 1, wherein, R also comprises Pr.

6. The R-T-B permanent magnet material according to claim 1, wherein, the R-T-B-based permanent magnet material satisfies any one of the following conditions:

(1) the content of Cu is 0.4-0.5 wt %, and the percentage refers to mass percentage in the R-T-B-based permanent magnet material;

(2) when X comprises Al, the content of Al is 0.3-0.8 wt %, and the percentage refers to mass percentage in the R-T-B-based permanent magnet material;

(3) the content of Ga is 0.2-0.5 wt %, and the percentage refers to mass percentage in the R-T-B-based permanent magnet material.

7. The R-T-B permanent magnet material according to claim 1, wherein, the R-T-B-based permanent magnet material satisfies any one of the following conditions:

(1) M is Ti;

(2) M is Zr;

(3) M is Nb;

(4) M is Ti and Zr.

8. The R-T-B permanent magnet material according to claim 1, wherein, when M comprises Ti, the content of Ti is 0.3-0.6 wt %, and the percentage refers to mass percentage in the R-T-B-based permanent magnet material;

or, when M comprises Zr, the content of Zr is 0.3-0.6 wt %, and the percentage refers to mass percentage in the R-T-B-based permanent magnet material;

or, when M comprises Nb, the content of Nb is 0.35-0.55 wt %, and the percentage refers to mass percentage in the R-T-B-based permanent magnet material;

or, when M comprises Ti and Zr, the content of Ti is 0.2 wt % and the content of Zr is 0.3 wt %, and the percentage refers to mass percentage in the R-T-B-based permanent magnet material.

9. The R-T-B permanent magnet material according to claim 1, wherein,

M is any one element of Ti, Zr and Nb, provided that when M is Ti, the content of Ti is 0.3-0.6 wt %, when M is Zr, the content of Zr is 0.3-0.6 wt %, when M is Nb, the content of Nb is 0.35-0.55 wt %;

X comprises Cu, Al and Ga, the content of Al is 0.3-0.8 wt %, the content of Ga is 0.2-0.5 wt %; and the content of Co is 0.8-2.0 wt %;

the percentage refers to mass percentage in the R-T-B-based permanent magnet material.

10. The R-T-B permanent magnet material according to claim 1, wherein, M is Ti, the content of Ti is 0.55-0.6 wt %.

11. The R-T-B permanent magnet material according to claim 1, wherein, RH is selected from the group consisting of Dy and Tb.

12. The R-T-B permanent magnet material according to claim 1, wherein, the content of RH is 0.7-2.0 wt %.

13. A preparation method for the R-T-B-based permanent magnet material according to claim 1, wherein, the preparation method comprises the following steps: the molten liquid of a raw material composition of the R-T-B-based permanent magnet material is subjected to casting, crushing, pulverizing, forming, sintering and grain boundary diffusion treatment, and the R-T-B-based permanent magnet material is obtained;

wherein the raw material composition of the R-T-B-based permanent magnet material comprises R, B, M, Fe, Co, X and unavoidable impurities, wherein:

(1) R is rare earth element, and R comprises at least Nd and RH; RH is heavy rare earth element; the content of RH is 0.6-2.0 wt %;

M is at least one element selected from the group consisting of Ti, Zr and Nb;

X comprises (a) Cu and Ga, or (b) Cu, Al and Ga;

(2) in the raw material composition of the R-T-B-based permanent magnet material, by mass percentage:

R: 30.5-32.0 wt %;

B: 0.95-0.99 wt %;

M: 0.3-0.6 wt %;

X: 0.8-1.8 wt %, and Cu: 0.35-0.50 wt %;

the balance being Fe, Co and unavoidable impurities.

14. The preparation method for the R-T-B-based permanent magnet material according to claim 13, wherein, the molten liquid of the raw material composition of the R-T-B-based permanent magnet material is prepared by the following method: smelting in a high-frequency vacuum induction smelting furnace;

and, the process of the casting is carried out according to the following steps: in an Ar gas atmosphere, cooling at a rate of $10^2$° C./sec-$10^4$° C./sec;

and, the process of the crushing is carried out according to the following steps: hydrogen absorption, dehydrogenation and cooling treatment; the pulverizing is jet milling;

and, the process of the forming is a magnetic field forming method or a hot pressing and heat deforming method;

and, the process of the sintering is carried out according to the following steps: preheating, sintering and cooling in vacuum conditions;

and, the grain boundary diffusion treatment is carried out according to the following steps: a substance containing Tb or Dy is adhered to the surface of the R-T-B-based permanent magnet material by vaporizing, coating or sputtering, and diffusion heat treatment is carried out;

and, after the grain boundary diffusion treatment, a heat treatment is also carried out.

15. The preparation method for the R-T-B-based permanent magnet material according to claim 13, wherein, in the raw material composition of the R-T-B permanent magnet material, X comprises Cu, Al and Ga.

16. The preparation method for the R-T-B-based permanent magnet material according to claim 13, wherein, the raw material composition of the R-T-B permanent magnet material satisfies any one of the following conditions:

(1) R also comprises Pr;

(2) RH is selected from the group consisting of Dy and Tb.

17. The preparation method for the R-T-B-based permanent magnet material according to claim 13, wherein, in the raw material composition of the R-T-B permanent magnet material, RH is introduced during smelting and grain boundary diffusion;

wherein, the content of RH introduced during the smelting is 0.1-1.0 wt %; the content of RH introduced during the grain boundary diffusion is 0.1-1.0 wt %; and the percentage refers to mass percentage in the raw material composition of the R-T-B-based permanent magnet material.

18. The preparation method for the R-T-B-based permanent magnet material according to claim 13, wherein, the raw material composition of the R-T-B permanent magnet material satisfies any one of the following conditions:

(1) M is Ti;

(2) M is Zr;

(3) M is Nb;

(4) M is Ti and Zr.

19. The preparation method for the R-T-B-based permanent magnet material according to claim 13, wherein, in the raw material composition of the R-T-B permanent magnet material:

M is any one element of Ti, Zr and Nb, provided that when M is Ti, the content of Ti is 0.3-0.6 wt %, when M is Zr, the content of Zr is 0.3-0.6 wt %, when M is Nb, the content of Nb is 0.35-0.55 wt %;

X comprises Cu, Al and Ga, the content of Al is 0.3-0.8 wt %, the content of Ga is 0.2-0.5 wt %; and the content of Co is 0.8-2.0 wt %;

the percentage refers to mass percentage in the raw material composition of the R-T-B-based permanent magnet material.

20. The preparation method for the R-T-B-based permanent magnet material according to claim 13, wherein, in the raw material composition of the R-T-B permanent magnet material, X comprises Cu, Al and Ga, the content of Al is 0.3-0.8 wt %, the content of Ga is 0.2-0.5 wt %; and the percentage refers to mass percentage in the raw material composition of the R-T-B-based permanent magnet material.

* * * * *